April 15, 1930.                F. C. CANNIFF                1,754,816
                              SUCKER ROD SOCKET
                              Filed June 20, 1928
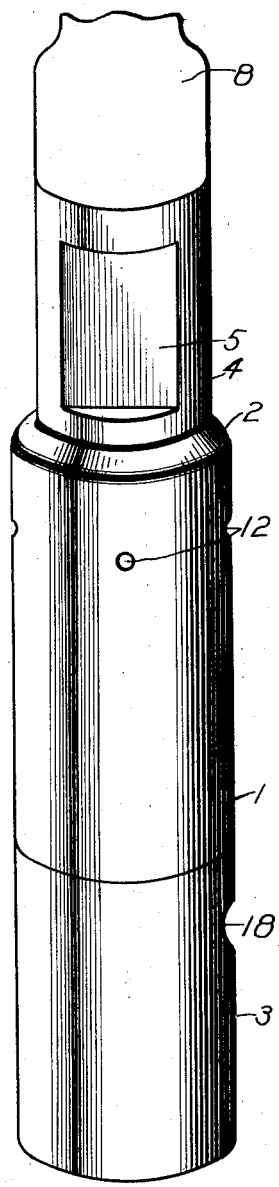
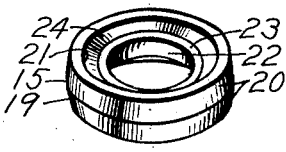
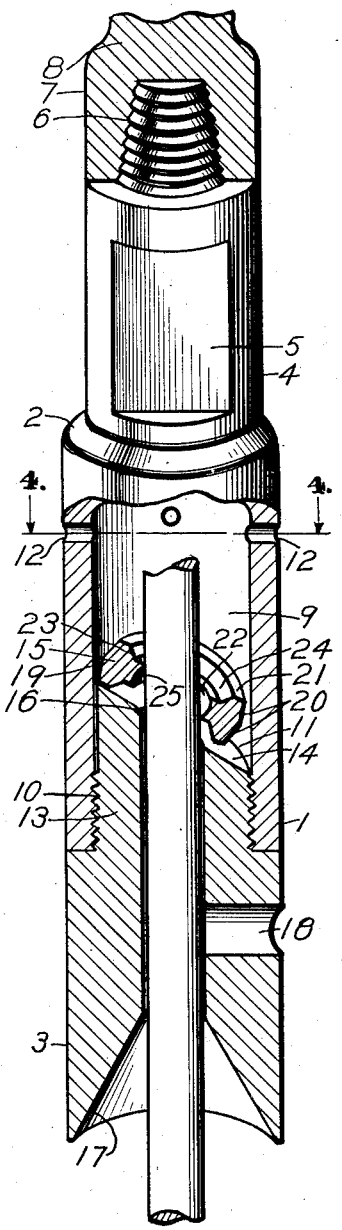
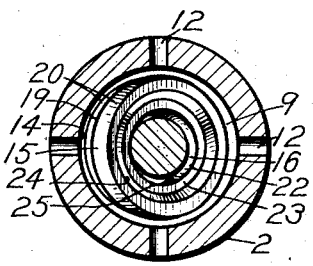
INVENTOR.
Fred C. Canniff
BY
ATTORNEYS.

Patented Apr. 15, 1930

1,754,816

UNITED STATES PATENT OFFICE

FRED C. CANNIFF, OF TULSA, OKLAHOMA

SUCKER-ROD SOCKET

Application filed June 20, 1928. Serial No. 286,889.

My invention relates to fishing tools employed in oil well drilling and pumping practice and more particularly to sucker rod sockets for retrieving broken sucker rods or like objects from a well; the principal object of the present invention being to provide for automatically and firmly gripping a rod so that the string of rods may be quickly and safely withdrawn, and for easy and prompt release of the gripped rod from the socket.

In accomplishing these and other objects of the invention I have provided improved details of structure, the preferred forms of which are illustrated in the accompanying drawings, wherein:

Fig. 1 is a perspective view of my improved socket attached to a connector coupling shown fragmentarily.

Fig. 2 is a perspective view of the socket and coupling similar to Fig. 1 and partly in central vertical section showing a gripping ring engaged with a sucker rod.

Fig. 3 is a detail perspective view of the gripping ring.

Fig. 4 is a transverse section of the socket on the line 4—4, Fig. 2.

Referring in detail to the drawings:

1 designates an assembled socket including an upper cylindrical body section 2 and a lower cylindrical section 3 equal in diameter to the upper section and separably connected by means hereafter described.

Formed at the upper end of the body section 2 is a reduced shank 4 having flat side faces 5 oppositely arranged thereon for engagement with a wrench, and a threaded pin 6 on the end of the shank for engagement with the threaded box 7 of a connector coupling 8, the coupling being suspended from a cable (not shown) whereby the socket may be lowered in a well for a rod-recovering operation.

The lower portion of the member 2 is provided with a bore 9 and with internal threads 10 at the lower end of the bore. The bore extends upwardly to a point slightly below the shank, to provide a ring-receiving chamber 11. Vent ports 12 are provided in the walls of the member adjacent the upper end of the bore.

Engaged with the threaded portion 9 of the member 2 is a reduced neck portion 13 of the body section 3 having an inclined end face 14 constituting a floor for seating a gripping ring 15. A central opening 16 extending vertically and centrally through the section 3 terminates in a flared mouth 17 at the bottom of the member for receiving a sucker rod for engagement by the ring.

In order that the body sections 2 and 3 may be readily assembled or disconnected, I prefer to provide a side opening 18 in the lower section 3 for engagement by a bar or like means so that the member 3 may be rotated relative to the member 2 for effecting threaded engagement or disengagement.

The gripping ring 15 is loosely mounted in the bore 9 and comprises a relatively thick outer portion 19 having a convex peripheral wall 20 and a relatively thin concentric inner portion 21 provided with a concave wall 22 of less width than the outer portion, the portion 21 having flat end surfaces 23 connected with the outer ring portion through tapered walls 24.

The converging of the concave wall 22 of the inner ring portion with the flat end surfaces 23 produces beveled edges or annular teeth 25 formed at opposite ends of the ring opening, the teeth being adapted for gripping engagement with a sucker rod due to the tilting of the ring on the inclined surface of the neck 13.

In practicing with the device, a ring 15 having an opening of the proper size for engagement with a broken sucker rod is placed in the bore 9 and the device is then assembled and lowered into a well.

The flared mouth 17 guides the end of the broken rod into the opening 15, the rod passing up through the opening into the bore 9 and through the ring 15.

When the rod has entered the socket, lifting movement of the socket will cause the ring to engage the high side of the inclined face 14 and tilt, thereby bind on the sucker rod so that the upper annular tooth engages one side of the rod and the lower tooth engages the opposite side, thereby gripping the rod with a degree of firmness in proportion to the suspended weight so that a string of rods may be withdrawn from the well.

After the rods are withdrawn and the ring is relieved of the weight, disengagement automatically results so that the socket may be removed from the rod.

The relative thickness of the outer portion of the ring provides a substantial degree of strength, while the relative thinness of the inner portion provides for narrowly spaced opposing biting edges and annular teeth formed on a circle of relatively small diameter whereby a substantial extent of each edge may engage the rod. The concave inner wall of the ring enhances the biting effect of the edges, and the convex outer wall, the flat ends of the inner portion, and the taper wall connecting the flat ends with the outer portion facilitate the positioning of the ring in extreme tilted position for firmly gripping the rod.

What I claim and desire to secure by Letters Patent is:

1. In combination with a barrel having a reduced opening at one end and an inclined seat surrounding the opening, a rod gripping ring slidable in the barrel having an enlarged outer portion including flat end faces adapted for contact with said seat, a relatively thin inner portion comprising flat end walls inset from said end faces and a concave inner wall surrounding the ring opening between said end walls and having annular edge forming gripping teeth.

2. In combination with a barrel having a reduced opening at one end and an inclined seat encircling the opening, a rod gripping ring loose in the barrel, having an enlarged outer portion including oppositely disposed flat faces, adapted for contact with said seat when the ring rests thereon, a relatively thin inner portion including flat end walls equally spaced from respective faces of said enlarged portion and at right angles to the axis of the ring, and a recessed inner wall connecting the end walls of said inner portion and providing annular gripping edges for engagement with a rod projected through said opening.

In testimony whereof I affix my signature.

FRED C. CANNIFF.